July 23, 1935.    R. S. SANFORD    2,009,096
BRAKE
Filed Sept. 21, 1931
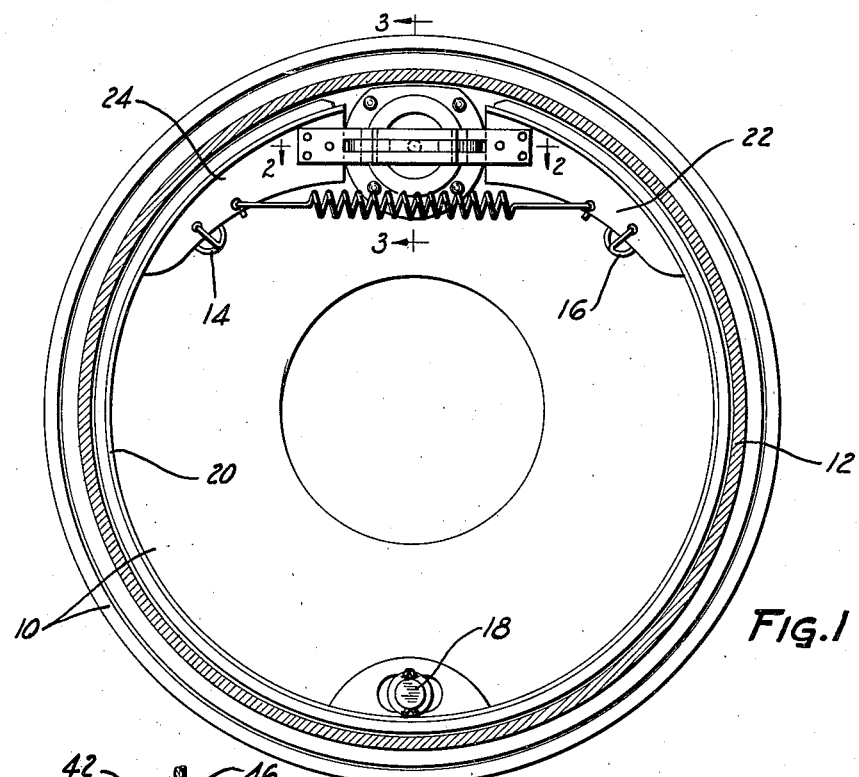
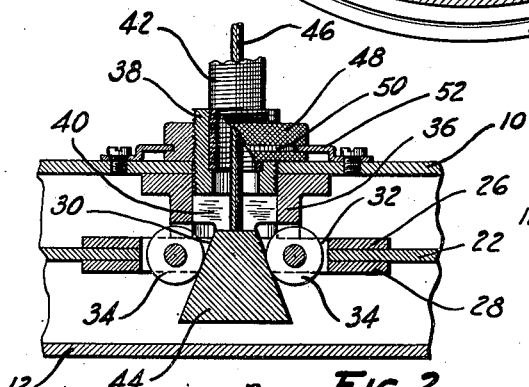 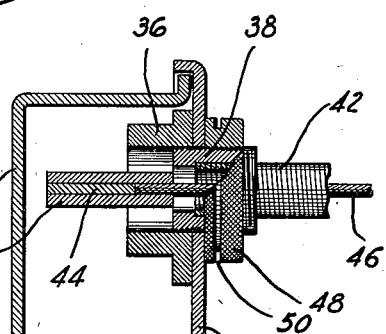
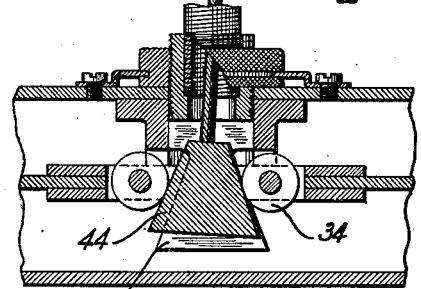
INVENTOR.
ROY S. SANFORD
BY
ATTORNEY.

Patented July 23, 1935

2,009,096

UNITED STATES PATENT OFFICE 2,009,096

BRAKE

Roy S. Sanford, South Bend, Ind., assignor to Bendix Aviation Corporation, South Bend, Ind., a corporation of Delaware Application September 21, 1931, Serial No. 563,921

20 Claims. (Cl. 188—78)

This invention relates to brakes and more particularly to internal expanding brakes.

Broadly, the invention comprehends a combined operating and adjusting means for the friction elements of an internal expanding brake including an adjustable anchor comprising a sleeve having formed integral therewith a wedge-shaped bifurcated portion. The sleeve has secured thereto a conduit, and positioned on the sleeve is an adjusting member for simultaneously adjusting the anchor and the conduit. The operating means includes a wedge-shaped member positioned between the bifurcated portions of the anchor and secured to this member is a cable extending through the sleeve and conduit to a source of power, not shown.

An object of the invention is to provide an adjusting means for the friction element of an internal expanding brake including means for simultaneously adjusting the operating means.

Another object of the invention is to provide a combined adjusting and operating means for the friction element of an internal expanding brake.

Another object of the invention is to provide an anchor for the friction element of an internal expanding brake having means incorporated therein for adjusting and operating the friction element.

A further object of the invention is to provide an anchor for the friction element of an internal expanding brake having a conduit for an operating cable connected thereto and means associated therewith for adjusting the anchor and conduit simultaneously.

Yet a further object of the invention is to provide an operating member for the friction element of an internal expanding brake including a bifurcated anchor and a member movable between the bifurcations to effectively spread the friction element.

A feature of the invention is a bifurcated adjustable anchor.

Another feature of the invention is a bifurcated adjustable anchor having secured thereto a conduit.

And yet another feature of the invention is an adjustable bifurcated anchor having a conduit secured thereto, together with means for adjusting the cable and conduit simultaneously, and a floating operating member slidably positioned between the bifurcated portions of the anchor and connected to an operating cable extending through the conduit.

Other objects and features of the invention will appear from the following description taken in connection with the drawing, which forms a part of this specification, and in which:

Figure 1 is a vertical sectional view through a brake taken just back of the head of the drum illustrating the friction element in side elevation and showing the invention as applied;

Figure 2 is a sectionalized view substantially on line 2—2, Figure 1;

Figure 3 is a sectionalized view substantially on line 3—3, Figure 1; and

Figure 4 is a sectionalized view corresponding to Figure 2 illustrating the position of the floating wedge-shaped member when the brake is applied.

Referring to the drawing for more specific details of the invention, 10 represents a fixed support such as a backing plate. The backing plate has associated therewith a rotatable drum 12 which may be secured to a wheel, not shown, and positioned on the backing plate are suitable steady rests 14, 16 and 18.

As shown, a friction element comprising a split band 20 is supported on the backing plate by the steady rests 14, 16 and 18. The band is provided with flanges 22 and 24 suitably secured to the separable ends of the band and spot-welded or otherwise secured to the flanges are reinforcing plates 26 and 28 arranged on opposite sides of the band and provided with bevelled end portions 30, the object of which will hereinafter appear. These bevelled end portions have transverse slots 32 in which are positioned for rotation suitable rollers 34.

Positioned on the backing plate adjacent the separable ends of the friction element is a bracket comprising a sleeve 36 slotted to receive the rollers 34 and slidably mounted in the bracket is a hollow cylindrical anchor 38 having a wedge-shaped bifurcated end portion 40 positioned between the rollers. As shown, the anchor is axially bored and suitably secured in the bore is one end of a conduit 42.

Slidably positioned between the bifurcated end portions 40 of the anchor is an operating member comprising a wedge-shaped plate 44 suitably connected to an operating cable 46 extending through the anchor and the conduit connected thereto to a suitable source of power, not shown.

This operating member engages the rollers 34 on the separable ends of the friction element to spread the element against the braking surface of the drum. Because of the floating characteristic of the operating member 44 this member floats with the friction element in either direction of drum rotation, always remaining in direct engagement with the rollers 32.

Threaded on the anchor is a nut 48 provided with a circumferential slot 50 adaptable for the reception of tongues 52, suitably secured on the backing plate. By adjusting the nut 48 the anchor 38 may be adjusted to compensate for wear on the friction lining of the brake, and simultaneously with the adjustment of the anchor the conduit is adjusted to take up any slack in the cable 40 due to the adjustment of the anchor.

In operation, force is applied to the cable to move the operating member 44 transversely between the rollers 34. The wedging effect of the operating member between the roller effectively spreads the friction elements into drum engagement.

Upon engagement of the friction element with the drum, the element is given a slight centrifugal movement, due to the wiping action of the drum causing one end of the friction element to move away from the anchor and the other end to engage the anchor. When the brake is applied the operating member floats toward either one side of the anchor or the other according to the direction of drum rotation.

As shown in Figure 4 the floating operating member 44 follows the friction element and is continuously in a wedging position between rollers regardless of the direction of drum rotation.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a friction element, an anchor therefor having an axial bore, a conduit secured in one end of the bore, an operating member associated with the anchor and conduit, and means for moving the anchor to simultaneously adjust the friction element and the operating member.

2. A brake comprising a friction element, an anchor therefor including a member having a bifurcated wedge-shaped portion and an axial bore, a conduit secured in one end of the bore, an operating element associated with the anchor, a tension element connected to the operating element extending through the conduit, and means for moving the anchor to simultaneously adjust the friction element and the operating element.

3. A brake comprising an anchor including a member having a bifurcated wedge-shaped end and an axial bore, a conduit secured in the bore, a movable member between the bifurcations, and a cable attached to the movable member extending through the conduit.

4. A brake comprising an anchor including a member having a biurcated wedge-shaped end and an axial bore, a conduit having one end secured in the bore, and a movable wedge-shaped member between the bifurcations, a cable connected to the movable member extending through the conduit, and means for adjusting the anchor axially.

5. A brake comprising a fixed support, a sleeve on the support, an anchor movable in the sleeve having an axial bore and a bifurcated end portion, a cable secured in the axial bore, an operating member movable between the bifurcations and a cable connected to the operating member and extending through the conduit.

6. A brake comprising a fixed support, a sleeve positioned on the support, an anchor movable in the sleeve, a conduit secured to the anchor, an operating member movable through the anchor, a cable connected to the operating member and extending through the conduit, and means on the fixed support for adjusting the anchor.

7. A brake comprising a fixed support, a sleeve positioned thereon, a bifurcated anchor movable in the sleeve, a conduit secured to the anchor, an operating member slidable between the bifurcations of the anchor, a cable secured to the operating member extending through the conduit, and a nut carried by the backing plate for adjusting the anchor.

8. A brake comprising a fixed support, a sleeve on the support, an anchor movable in the sleeve having an axial bore and a wedge-shaped bifurcated end portion, a conduit secured in the axial bore, a nut carried by the backing plate for adjusting the anchor and conduit, a wedge-shaped floating operating member between the bifurcations on the anchor, a cable connected to the operating member and extending through the conduit.

9. A brake comprising a fixed support, a rotatable drum associated therewith, a friction element on the support for cooperating with the drum, rollers on the separable ends of the friction element, a sleeve on the fixed support, an anchor movable in the sleeve having a bifurcated wedge-shaped end portion positioned between the separable ends of the friction element, an operating member slidable between the bifurcated end portions and adaptable to engage the rollers, a cable connected to the operating member and extending through the conduit and means on the fixed support for simultaneously adjusting the anchor and the conduit.

10. A brake comprising a fixed support, a rotatable drum associated therewith, a friction element on the support adaptable for cooperation with the drum, reinforcing plates secured to the separable ends of the friction element and provided with oppositely bevelled ends, rollers on the separable ends of the friction element, a sleeve positioned on the support, an anchor movable in the sleeve, a bifurcated wedge-shaped end portion on the anchor adapted to receive the bevelled ends of the friction element, a conduit secured to the anchor, a floating wedge-shaped operating member movable in the bifurcated end portion and adaptable for engagement with the rollers, an operating cable connected to the operating member and extending through the conduit, and means on the fixed support for simultaneously adjusting the anchor and the conduit.

11. A fully enclosed brake comprising a friction element, a movable anchor therefor, a conduit connected to the anchor, an applying means associated with the anchor including a tension element extending through the conduit, and means for moving the anchor axially for simultaneous adjustment of the friction element and the applying means.

12. A brake having friction means anchoring alternatively at one end or the other, an adjustable anchorage device engageable by both of said ends, applying means therefor, and a single means for adjusting both the anchorage means and the applying means to compensate for wear of the friction means.

13. A brake having friction means, anchorage means therefor including a flexible conduit and a tension element passing through the conduit into the brake, applying means therefor, and a single means for adjusting both the anchorage means and the relationship of the conduit and said tension element to compensate for wear of the friction means.

14. A brake anchorage and applying device comprising an anchorage member, a conduit engaging said member, a tension element passing through the conduit and having attached thereto an applying device adjacent the anchorage member, and a part engaging the anchorage member and operable to adjust it for brake wear and simultaneously shifting the conduit relatively to the tension element to adjust the applying device.

15. A brake anchorage and applying device comprising an anchorage member, a conduit engaging said member, and a tension element passing through the conduit and having attached thereto an applying device adjacent the anchorage member, said anchorage member being movable to adjust it for brake wear and simultaneously to shift the conduit relatively to the tension element to adjust the applying device.

16. A brake having a wedge-shaped applying device, and a brake anchorage including a wedge-shaped part which is adjustable to compensate for brake wear and means operated by the adjustment of said part simultaneously to adjust the applying device.

17. A brake having an applying device including a conduit and a tension element passing therethrough, and a brake anchorage which is adjustable to compensate for brake wear and the adjustment of which simultaneously shifts the conduit and tension element relatively to each other to adjust the applying device.

18. A brake comprising a support, a conduit terminating adjacent the support, a tension element passing through the conduit into the brake and there having an applying member, means acting on the support and the conduit for shifting the end of the conduit to adjust it to take up slack in the tension element, and a brake anchorage adjusted by the operation of said means to shift the end of the conduit.

19. A brake comprising, in combination with a backing plate, a conduit, a tension element passing through the conduit and having an applying member, a brake anchorage varied as to its effective width by shifting it relatively to the backing plate, and means for so shifting said anchorage and also acting on the conduit for shifting it to adjust it to take up slack in the tension element, said means including a hollow element engaging the backing plate and guiding the tension element through the backing plate into the interior of the brake.

20. A brake-applying device comprising, in combination with a backing plate, a conduit and a tension element passing through the conduit, a brake anchorage, and means for changing the effective width of said anchorage and for shifting the conduit to increase its effective length relatively to the length of the tension element to take up slack in the tension element, said means including a hollow element engaging the backing plate and guiding the tension element through the backing plate into the interior of the brake.

ROY S. SANFORD.

CERTIFICATE OF CORRECTION.

Patent No. 2,009,096.                                                                 July 23, 1935.

ROY S. SANFORD.

It is hereby certified that error appears in the printed specification of the above numbered patent requiring correction as follows: Page 3, first column, line 1, claim 13, beginning with the word "including" strike out all to and including the word "brake" in line 3, and insert the same after "therefor" in line 3; and that the said Letters Patent should be read with this correction therein that the same may conform to the record of the case in the Patent Office.

. Signed and sealed this 7th day of January, A. D. 1936.

(Seal)                                                                  Leslie Frazer
                                                                      Acting Commissioner of Patents.